US008701870B1

(12) United States Patent
Farley et al.

(10) Patent No.: US 8,701,870 B1
(45) Date of Patent: Apr. 22, 2014

(54) SLAT FOR A MATERIAL MOVING SYSTEM FOR AN AGRICULTURAL HARVESTING MACHINE

(71) Applicant: CNH America LLC, New Holland, PA (US)

(72) Inventors: Herbert M. Farley, Elizabethtown, PA (US); Andrew V. Lauwers, Stevens, PA (US); Robert Stewart Boyd, III, Mount Joy, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/653,444

(22) Filed: Oct. 17, 2012

(51) Int. Cl.
*B60P 1/36* (2006.01)
*B65G 19/10* (2006.01)
*B65G 19/22* (2006.01)

(52) U.S. Cl.
CPC . *B60P 1/36* (2013.01); *B65G 19/10* (2013.01); *B65G 19/22* (2013.01)
USPC .............. 198/728; 198/727; 56/14.3; 56/14.6

(58) Field of Classification Search
USPC ................. 198/725, 727, 728, 729, 731, 732; 56/14.3–14.6, 345–353, 59, 69, 75, 78, 56/82, 88, 106, 108, 118
See application file for complete search history.

(56) References Cited

U.S. PATENT DOCUMENTS

| | | | | |
|---|---|---|---|---|
| 1,928,237 A * | 9/1933 | Wickersham | | 56/351 |
| 3,318,441 A | 5/1967 | Keen et al. | | |
| 3,780,851 A * | 12/1973 | Bichel et al. | | 198/730 |
| 3,967,719 A * | 7/1976 | Kloefkorn et al. | | 198/550.12 |
| 4,003,191 A * | 1/1977 | Todd et al. | | 56/14.6 |
| 4,227,538 A | 10/1980 | Long et al. | | |
| 4,563,944 A | 1/1986 | Tate | | |
| 5,346,429 A * | 9/1994 | Farley | | 460/16 |
| 5,899,051 A * | 5/1999 | Ahle | | 56/14.5 |
| 6,058,666 A | 5/2000 | Lin | | |
| 6,513,648 B1 | 2/2003 | Hallstrom et al. | | |
| 6,651,806 B2 | 11/2003 | Hallstrom | | |
| 6,968,942 B2 * | 11/2005 | Linder | | 198/841 |
| 6,988,345 B1 | 1/2006 | Pelfrey et al. | | |
| 7,090,070 B2 * | 8/2006 | Linder | | 198/841 |
| 7,260,967 B2 | 8/2007 | Gryspeerdt | | |
| 7,473,168 B2 | 1/2009 | Day et al. | | |
| 7,766,736 B2 * | 8/2010 | Ramp et al. | | 460/16 |
| 8,474,605 B2 * | 7/2013 | Lauwers et al. | | 198/834 |
| 2010/0006395 A1 | 1/2010 | Cannell | | |

FOREIGN PATENT DOCUMENTS

SU         1665930 A1    7/1991

* cited by examiner

*Primary Examiner* — Mark A Deuble
(74) *Attorney, Agent, or Firm* — Patrick M. Sheldrake (57) ABSTRACT

A slat for use in an agricultural harvester including a web securable to a material moving system. A first and second leg extending outwardly from one side of the web, the first leg providing primary impetus for movement of crop material in a first direction by the material moving system. A third leg extending outwardly from an opposed side of the web and providing secondary impetus for movement of crop material by driven movement of the material moving system. In response to the slat encountering a foreign object that becomes wedged between the first leg, the third leg and structure of the material moving system and preventing driven movement of the material movement system in the first direction, upon application of force urging movement of the material movement system in an opposed second direction, the third leg facilitating a rotational movement of the slat for dislodging the foreign object.

20 Claims, 6 Drawing Sheets

SLAT FOR A MATERIAL MOVING SYSTEM FOR AN AGRICULTURAL HARVESTING MACHINE

This invention relates generally to a material moving system and, more specifically, to a slat for a material moving system for an agricultural harvesting machine.

BACKGROUND OF THE INVENTION

Agricultural harvesting machines such as combine harvesters generally are developed to handle a large variety of crops. For example a combine harvester may be used to harvest small grain crops such as wheat and rye, or grass seed or large grain crops such as peas or corn. In this manner the use of the harvester, which is a high investment tool, can be extended over a longer season.

Conventionally, the harvester is equipped with a detachable crop collecting attachment, such as a grain or corn header, which cuts the stems of the crop standing in the field and conveys the same to the inlet by a material moving system. Alternatively crop which has been cut previously can be lifted up from the field by a pick-up attachment and conveyed to the same inlet. The material moving system, commonly a chain elevator with transverse slats, pick up the collected crop deposited in front of the inlet and convey it rearwardly and upwardly towards the crop processing mechanism, conventionally a threshing drum and concave or grate assembly.

The transverse slats of the elevator must be structurally robust because of the increasing capacity of modern harvesters. Foreign objects, such as rocks, pieces of timber, or other objects conveyed to the inlet of the material moving system along with crop material can cause an abrupt seizure of the material movement system. Such seizures subject the slats to significant loads which may result in a permanent deformation of the slats.

In response, to increase their strength, the slats may be made out of a more complicated profile, such as an H-shaped profile constructed from opposed U-shaped portions joined together as shown in U.S. Pat. No. 7,473,168. However, slats having an H-shaped profile remain susceptible to problems associated with abrupt seizures of the material moving system caused by introduction of foreign objects. That is, one U-shaped portion of the H-shaped slat profile encounters the foreign object, with the foreign object becoming wedged against one side of a structure of the material moving system, and the opposed U-shaped portion of the H-shaped slat profile wedged against an opposed side of the structure of the material moving system.

One technique typically utilized by an operator in an attempt to dislodge the foreign object is to halt forward movement of the agricultural harvesting machine and attempt to reverse the direction of movement of the material moving system. However, due both to both legs of the U-shaped portion of the H-shaped profile being brought into wedged contact with the structure of the material moving system, the material moving system is immobilized, with such reverse movement forces often being insufficient to overcome the wedged condition. As a result, the operator is forced to try to remove the foreign object manually, which first requires manually clearing out crop material from the material moving system prior to being able to access the foreign object. Such manual effort is time-consuming, requiring a high degree of exertion by the operator, and otherwise highly undesirable.

Accordingly, there is a need for a structurally robust slat construction having an anti-wedge capability to help dislodge foreign objects from the material moving system.

SUMMARY OF THE INVENTION

In accordance with one aspect of the present invention, a slat for use in a material moving system of an agricultural harvester. The material moving system has at least two driven continuous loops of flexible material to which the slat is securable. The slat includes a web having opposed sides, the web securable to the loops of the material moving system. A first leg and a second leg extend outwardly from one side of the web and are positioned along the material moving system. The first leg provides a primary impetus for movement of crop material in a first direction by driven movement of the loops of the material moving system. A third leg extends outwardly from an opposed side of the web and intermediate of portions of the web that are securable to the loops of the material moving system. The third leg provides a secondary impetus for movement of crop material in the first direction by driven movement of the loops of the material moving system. Wherein in response to the first leg encountering a foreign object that becomes wedged between the first leg, the third leg and structure of the material moving system and preventing driven movement of the loops of the material movement system in the first direction, and in response to application of force urging movement of the loops of the material movement system in an opposed second direction, the third leg facilitates a rotational movement of the slat for dislodging the foreign object.

In accordance with one aspect of the present invention, an agricultural harvester includes a material moving system having at least two driven continuous loops of flexible material. A slat is secured to the loops of the material moving system. The slat includes a web having opposed sides, the web secured to the loops of the material moving system. A first leg and a second leg extend outwardly from one side and are positioned along the material moving system. The first leg provides a primary impetus for movement of crop material in a first direction by driven movement of the loops of the material moving system. A third leg extends outwardly from an opposed side of the web and intermediate of portions of the web that are securable to the loops of the material moving system. The third leg provides a secondary impetus for movement of crop material in the first direction by driven movement of the loops of the material moving system. In response to the first leg encountering a foreign object that becomes wedged between the first leg, the third leg and structure of the material moving system and preventing driven movement of the loops of the material movement system in the first direction, and in response to application of force urging movement of the loops of the material movement system in an opposed second direction, the third leg facilitates a rotational movement of the slat for dislodging the foreign object.

An advantage of the slat of the material moving system disclosed herein is that it has an anti-wedge capability.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are usually determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
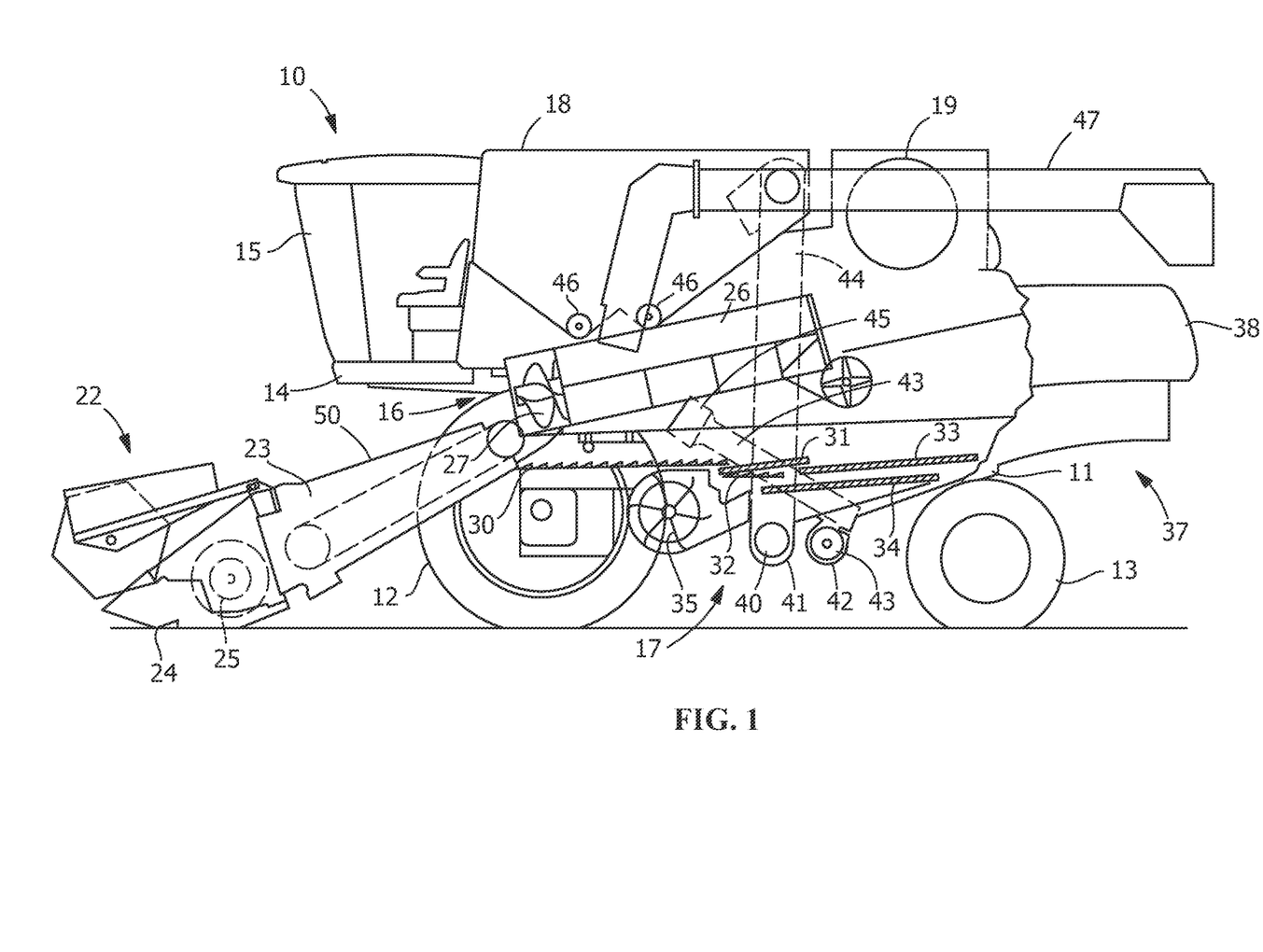
FIG. 1 is a diagrammatic, partly sectional side view of an agricultural harvester having a material moving system according to the present invention.

The combine harvester 10 shown in FIG. 1 of the accompanying drawings, is of the axial-flow type, wherein crop material is threshed and separated while it is advanced by and along a longitudinally arranged rotor 27. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional grain header 22 and a material moving system, such as elevator assembly 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22 and delivered by a header auger 25 to the inlet of the material moving system or elevator assembly 23, which supplies the cut crop to the threshing and separating assembly 16.

The threshing and separating assembly 16 comprises a generally cylindrical chamber 26 in which a rotor 27 is rotated to thresh and separate the crop received therein. That is, the crop is rubbed and beaten between the rotors 27 and the inner surfaces of the chambers 26, whereby the grain, seed or the like, is loosened and separated from the straw.

Grain which has been separated by the threshing and separating assembly 16 falls onto a first grain pan 30 of the cleaning assembly 17 which further also comprises a pre-cleaning sieve 31, positioned above a second grain pan 32, a pair of sieves 33, 34, disposed the one above the other, and a cleaning fan 35. The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads said grain across said sieves 31, 33, 34, while permitting the passage of cleaned grain by gravity through the apertures of these sieves. The grain on the sieves 31, 33, 34 is subjected to a cleaning action by the fan 35 which provides an air flow through said sieves to remove chaff and other impurities such as dust from the grain by making this material airborne for discharge from the machine through an outlet 37 of the straw hood 38.

Clean grain falls to a clean grain auger 40 in a clean grain auger trough 41 and is subsequently transferred therefrom by a grain elevator 44 to the grain tank 18. Tailings fall to a tailings auger (not shown) in a tailings auger trough 42. The tailings are transported sideways by said tailings auger to a separate rethresher 43 and returned by a tailings conveyor 45 to the cleaning assembly 17 for repeated cleaning action.

A pair of grain tank augers 46 at the bottom of the grain tank 18 is used to urge the clean grain sideways to an unloading tube 47 for discharge from the combine harvester 10.

As shown in greater detail in FIG. 2, the material moving system or straw elevator assembly 23 comprises a welded, substantially parallelepiped structure or housing 50 which is pivotably secured to the main frame 11 below the operator's platform 14. The structure or housing 50 comprises an upper wall 52 and a lower wall 53, interconnected by a pair of side walls 54. The rear end of the housing 50 is provided with a transverse drive shaft 56 which extends through the side walls 54 and is provided with a plurality of (e.g., four) sprockets 57. At the front end of the elevator assembly 23, a drum 59 is installed for rotation between the side walls 54. The drum has a front shaft 60 extending through apertures in the side walls and received in bearings 61 which are mounted to pivot arms 63. At their rear ends these arms 63 are pivotably affixed to the outside of the side walls 54 at pivots 64.

The material moving system or elevator assembly 23 comprises a plurality of endless, flexible members or continuous loops of flexible material, e.g. chains 66, which are trained along parallel paths over the sprockets 57 and the front drum 59. The chains are driven by the sprockets 57 on the drive shaft 56. Mounted across and to the chains is a plurality of generally transverse slats 68 which will be described in further detail hereinafter.

The lower wall 53 of the housing 50 may be provided with a wear plate along which the lower run 66a of the elevator mechanism of the material moving system conveys the harvested crop to the inlet of the threshing and separating assembly 16. During operation of the material moving system or elevator assembly 23, the drive shaft 56 is rotated in a counterclockwise (CCW) direction as seen in FIG. 2 for the slats 68 adjacent to the front drum 59 to engage and convey the crop material which is delivered thereto by the header auger 25. The slats of the lower run 66a convey the crop rearwardly and upwardly along the lower wall 53 or the wear plate, if present, to the outlet of housing 50, where the crop is combed away from the elevator mechanism by the front portion of the threshing rotor 27.

In order to prevent stray material that was not removed immediately from the elevator mechanism, falls back from the upper run 66b onto the lower run 66a and starts wrapping around the drive shaft 56 or accumulating around the sprockets 57, an intermediary shielding mechanism is provided between the lower and upper runs 66a, 66b of the elevator mechanism. In the present embodiment, the shielding mechanism comprises a stationary rear plate 70 and a removable front plate 71. The rear plate 70 is secured, such as by welding between and to the side walls 54 and to a transverse tubular reinforcement 73 disposed near the drive sprockets 57. The front plate 71 extends forwardly from the front edge of the rear plate 70 towards the front drum 59 and is attached by bolt mechanism 75 to the side walls 54 of the housing 50.

As illustrated collectively in FIGS. 3-10, slats 68 of the material moving system are constructed to generally resemble h-shaped profiles (lower case "h") or Y-shaped profiles. As further shown in FIG. 5, slat 68 includes a middle portion or web 83 interposed between a first leg 84 and a second leg 86 extending outwardly from one side of web 83, and a third leg extending outwardly from an opposed side of web 83. It is the combination of first leg 84, second leg 86, third leg 88 and web 83 that comprises the h-shaped profiles and Y-shaped profiles of slat 68. As further shown in FIGS. 3-4, first leg 84 provides a primary impetus for movement of crop material in the driven direction of the material moving system 23 (FIG. 2). In addition, third leg 88 provides a secondary impetus for movement of crop material in the driven direction of the material moving system 23. As further shown in FIG. 5, web 83 includes opposed or corresponding pairs of openings 96, 98 for attaching the slats 68 to adjacent chains 66 having different spacings from one another. That is, corresponding pairs of openings 96 are separated by one spacing between adjacent chains, and corresponding pairs of openings 98 are separated by a different spacing between adjacent chains 66. As further shown in FIG. 5, a width 92 of third leg 88 is less than a distance 100 corresponding to a minimal distance of corresponding pairs of openings 96. Stated another way, third leg 88 is intermediate of portions of web 83 that are securable to chains 66 of material moving system 23. In addition to providing enhanced structural rigidity, the h-shaped profiles and Y-shaped profiles also provide an anti-wedge capability, as will be discussed in further detail below.

Figure 2:
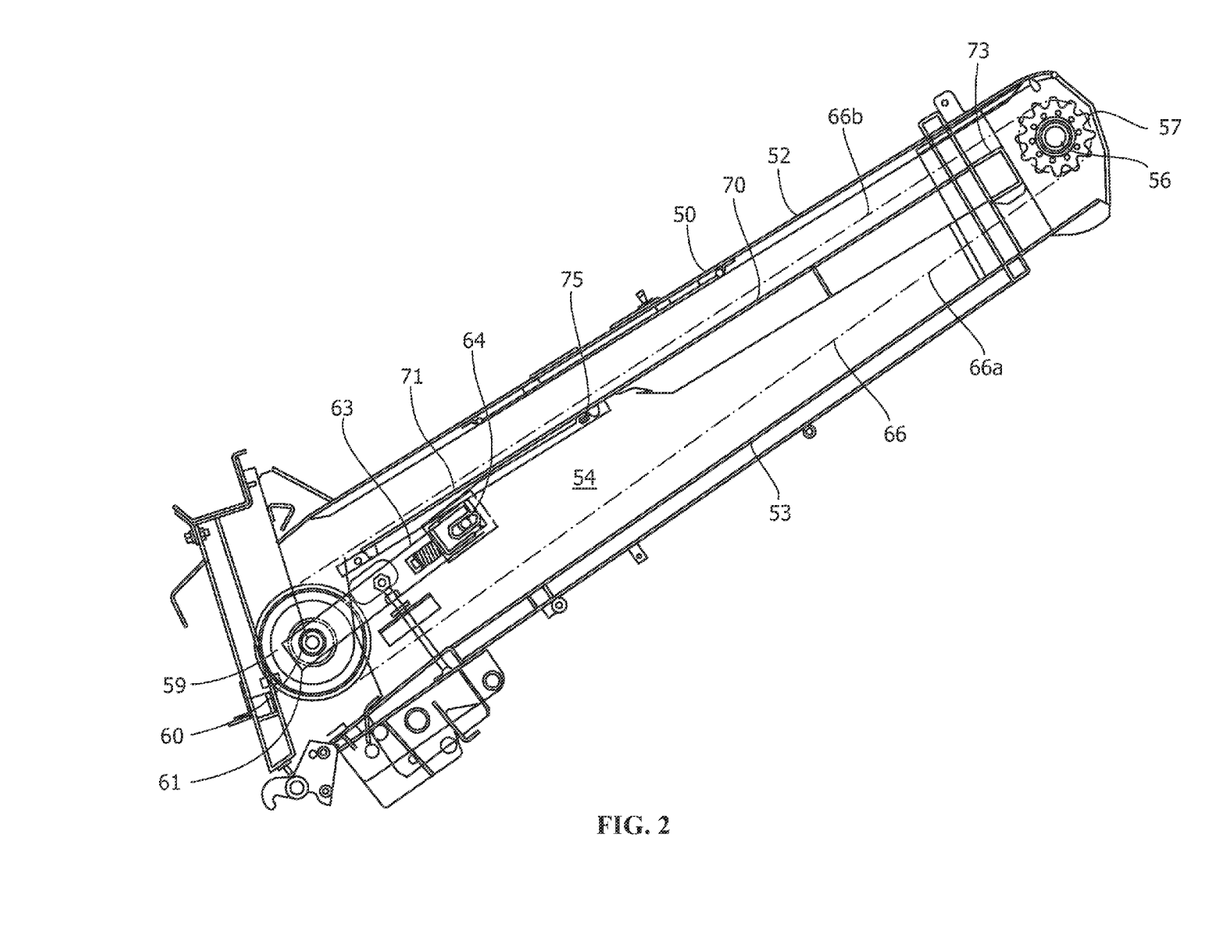
FIG. 2 is cross sectional view of the material moving system of FIG. 1 according to the present invention.
Figure 3:
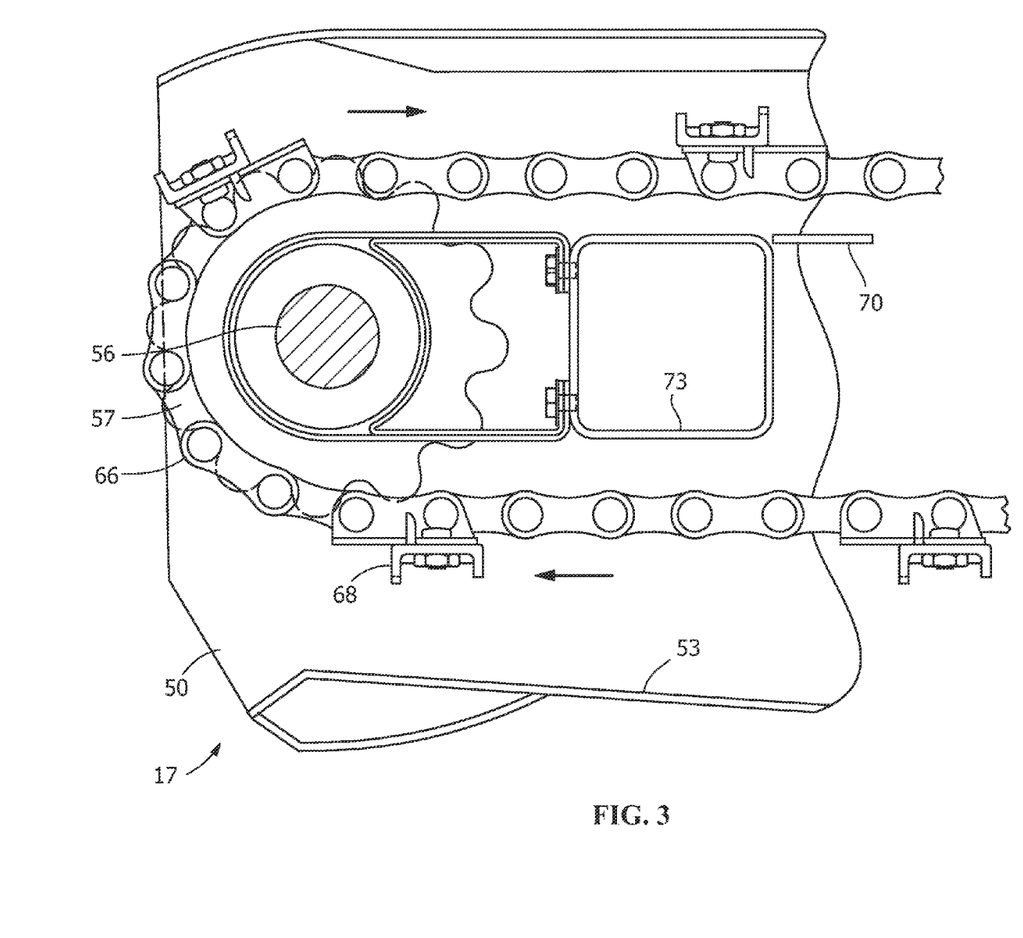
FIG. 3 is an enlarged cross sectional view of the rear end of the material moving system according to the present invention.
Figure 4:
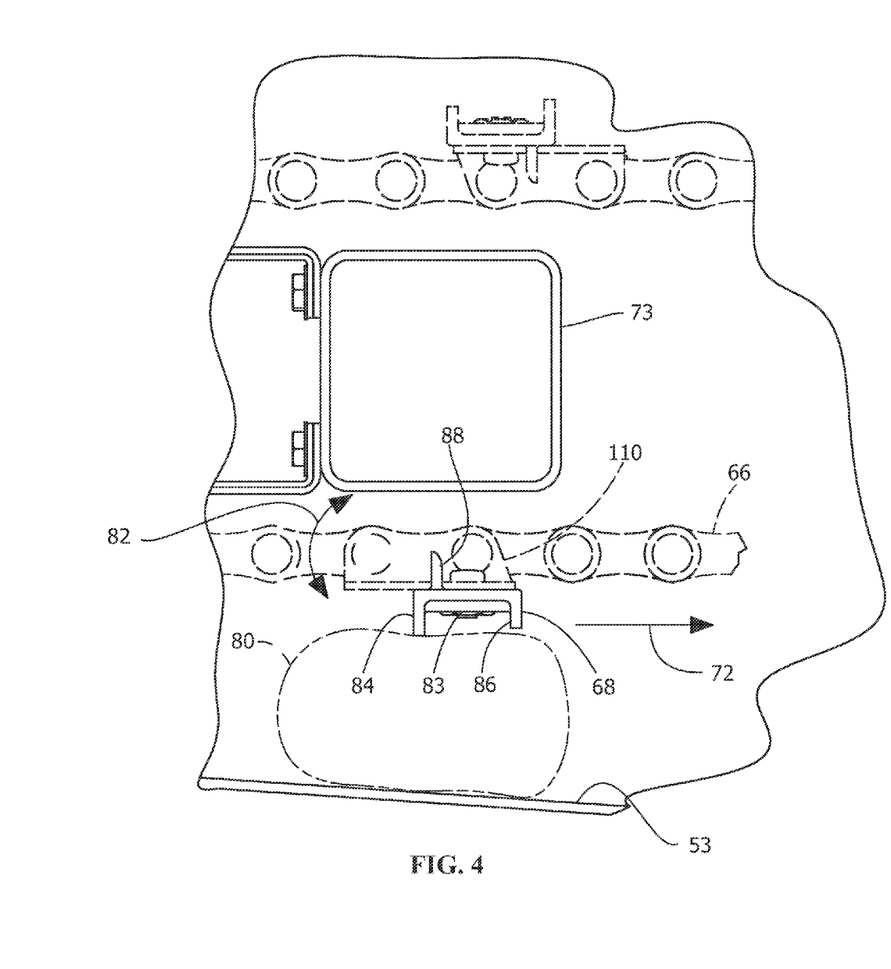
FIG. 4 is an enlarged, partial cross sectional view of FIG. 3 of the material moving system encountering a foreign object according to the present invention.

As further shown collectively in FIGS. 2-4, slat 68 operate as part of material moving system 23, in which slat 68 is secured to adjacent chains 66. As further shown in FIG. 4, at least first leg 84 encounters a foreign object 80 that becomes wedged between first leg 84, third leg 88 and structure of the material moving system, such as the lower wall 53 and tubular reinforcement 73. In another foreign object encountering situation, first leg 84, second leg 86, third leg 88 and structure of the material moving system, such as the lower wall 53 and tubular reinforcement 73. In the wedged condition, further driven movement of chains 66 in a clockwise (CW) direction as shown in FIG. 3 is prevented. One technique that is typically utilized to dislodge foreign object 80, as shown in FIG. 4, involves reversing the direction of driven movement of chains 66 in a counterclockwise (CCW) direction. The technique may also include additional sets of direction reversal, as required. In a conventional H-shaped profile (fourth leg 110 of H-shaped profile shown in phantom line in FIG. 4), in order to dislodge the wedged foreign object 80, a significant amount of force must be applied to the chains 66 in the counterclockwise (CCW) direction, as the force must collectively and simultaneously overcome the opposed friction force between the four legs 84, 86, 88, 110 and the structure of the material moving system and the foreign object. Stated another way, the resistance or opposed friction requires what constitutes a "dead pull", since the collective four legs form a stable base that generally tends to maintain the H-shaped slat in the same orientation relative to the structure of the material moving system, such as the lower wall 53 and tubular reinforcement 73.

Figures 8, 9:
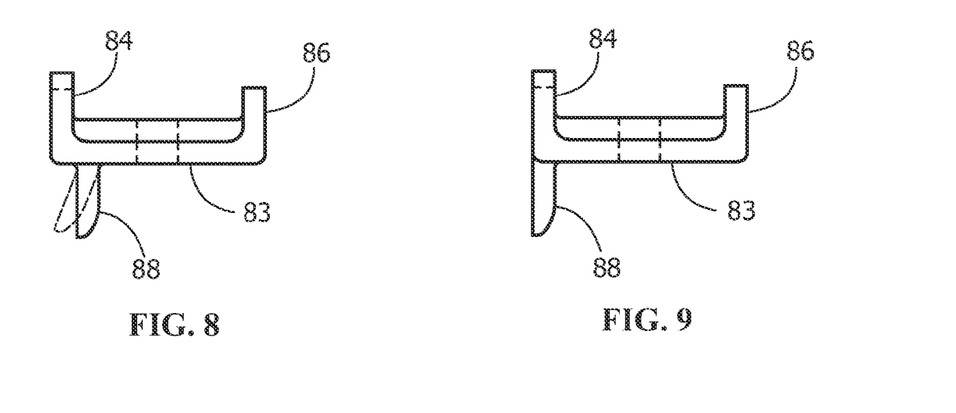
FIGS. 8-10 are taken along line 8-8 of FIG. 5 of exemplary embodiments of the slat according to the present invention.
Figure 10:
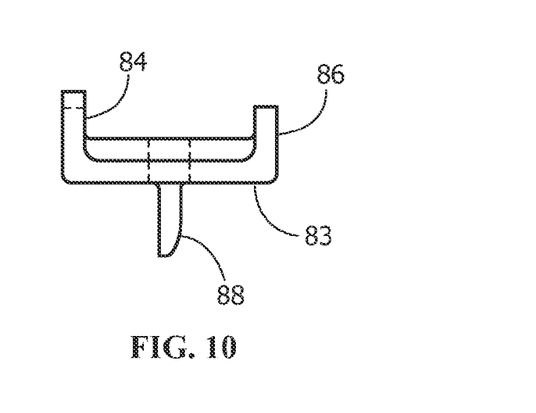

In contrast to the H-shaped slat (fourth leg 110 shown in phantom line in FIG. 4), h-shaped slat and/or Y-shaped slat, as further shown in respective FIG. 9 and FIG. 10 each represent a slat construction lacking a fourth leg 110. FIG. 4 yet further shows h-shaped slat 68 encountering foreign object 80 and becoming wedged between first leg 84, third leg 88 and structure of the material moving system, such as the lower wall 53 and tubular reinforcement 73. However, as a result of h-shaped slat 68 not having fourth leg 110, h-shaped slat 68 as an anti-wedge capability. That is, in response to h-shaped slat 68 being subjected to the wedged arrangement with foreign object 80 and then subjected to forces associated with bringing about driven movement of chains 66 in a counterclockwise (CCW) direction 72, h-shaped slat 68 does not prevent a disengaging rotational movement 82. Disengaging rotational movement 82, as further shown in FIG. 4, may occur in either rotational direction along a longitudinal axis of the slat, depending upon, among other considerations, the profile of foreign object 80. Disengaging rotational movement 82 refers to rotational movement of h-shaped slat 68 along a longitudinal axis of the slat relative to the structure of the material moving system. As a result of disengaging rotational movement 82, a reduced amount of force applied to chains 66 should result in dislodging foreign object 80. By permitting a reduced dislodging force, application of reversed directional forces to chains 66 are more likely to result in successful dislodging of foreign objects, which if unsuccessful, might otherwise force the operator to resort to manual removal techniques.

Figure 5:
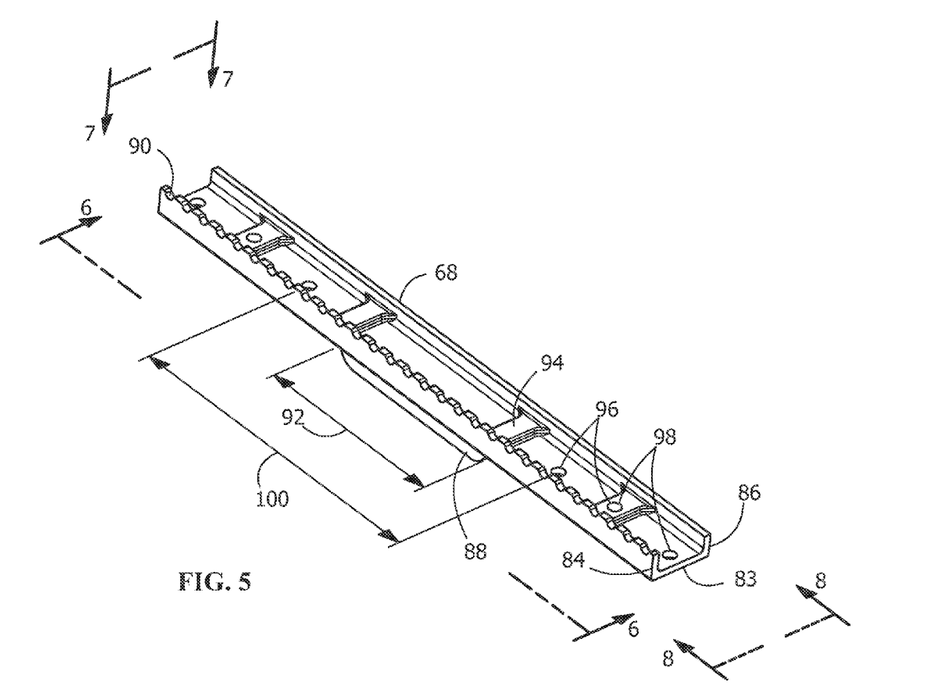
FIG. 5 is an inverted upper perspective view of an exemplary embodiment of a slat according to the present invention.
Figure 6:
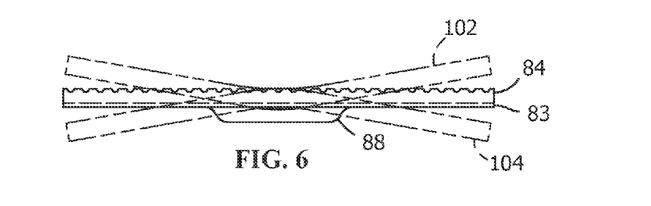
FIG. 6 is taken along line 6-6 from FIG. 5 of an exemplary embodiment of the slat according to the present invention.
Figure 7:
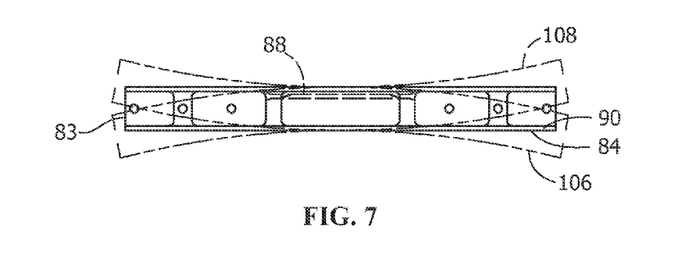
FIG. 7 is taken along line 7-7 from FIG. 5 of an exemplary embodiment of the slat according to the present invention.

In one embodiment, web 83 and at least one of first leg 84, second leg 86 and third leg 88 is substantially planar and in another embodiment is substantially rectangular. In another embodiment, web 83 and at least one of first leg 84, second leg 86 and third leg 88 may be curved. That is, web 83 and the legs 84, 86, 88 may be configured such as shown in FIG. 7, such as taken along line 7-7 from FIG. 5, in which web 83 may have a forward swept position 106 or a rearward swept position 108. Alternately and/or additionally, web 83 may be curved in a manner such as shown in FIG. 6 in which web 83 may have a cupped or concave 102 position or condition, or an inverted cup or convex 104 position or condition, or a combination of both. That is, web 83 and at least one of first leg 84, second leg 86 and third leg 88 may be curved and remain substantially planar or may be nonplanar. Additionally, first leg 84 and second leg 86 may be planar in one embodiment. Another embodiment, at least one of first leg 84, second leg 86 and third leg 88 be mutually parallel, including being mutually perpendicular to web 83 in another embodiment, or yet in another embodiment, at least one of first leg 84, second leg 86 and third leg 88 may be any combination of parallel, nonparallel, curved or any other orientation relative to each other or to web 83, depending upon the application. In yet another embodiment, at least one of second plate 86 and third leg 88 may include notches 90, such as normally associated with first leg 84 as shown in FIG. 5. In another embodiment, third leg 88 may be positioned between first leg 84 and second leg 86 in addition to any of the other identified combinations of positions, orientations and/or profiles relative to one another. In yet another embodiment, at least one of the first leg 84, second plate 86 third leg 88 and web 83 may have similar or different thicknesses and/or may have varying thicknesses, such as web 83 having stiffeners 94 formed therein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A slat for use in a material moving system of an agricultural harvester, the material moving system having at least two driven continuous loops of flexible material to which the slat is securable, the slat comprising:
   a web having opposed sides, the web securable to the loops of the material moving system;
   a first leg and a second leg extending outwardly from one side of the web and positioned along the material moving system, the first leg providing a primary impetus for movement of crop material in a first direction by driven movement of the loops of the material moving system; and
   a third leg extending outwardly from an opposed side of the web and intermediate of portions of the web that are securable to the loops of the material moving system, the third leg providing a secondary impetus for movement of crop material in the first direction by driven movement of the loops of the material moving system;
   wherein in response to the first leg encountering a foreign object that becomes wedged between the first leg, the third leg and structure of the material moving system and preventing driven movement of the loops of the material movement system in the first direction, in response to application of force urging movement of the loops of the material movement system in an opposed second direction, the third leg facilitating a rotational movement of the slat for dislodging the foreign object.

2. The slat of claim 1, wherein the third leg is between the first leg and the second leg.

3. The slat of claim 1, wherein the web is substantially planar.

4. The slat of claim 3, wherein the web is substantially rectangular.

5. The slat of claim 3, wherein the third leg is not perpendicular to the web.

6. The slat of claim 3, wherein the first leg, the second leg and a third leg are generally parallel to each other.

7. The slat of claim 6, wherein the first leg, the second leg and a third leg are generally perpendicular to the web.

8. The slat of claim 3, wherein the first leg and the third leg are not parallel to each other.

9. The slat of claim 6, wherein the first leg and the third leg are substantially coplanar.

10. The slat of claim 3, wherein at least one of the first leg, the second leg in the third leg are not parallel to each other.

11. The slat of claim 1, wherein the web is curved.

12. The slat of claim 11, wherein at least one of the first leg, second leg and third leg are curved.

13. The slat of claim 11, wherein the first leg, the second leg and the third leg are generally parallel to each other.

14. The slat of claim 11, wherein the third leg is between the first leg and the second leg.

15. The slat of claim 1, wherein at least one of the web, first leg, second leg and third leg has a variable thickness.

16. An agricultural harvester comprising:
   a material moving system having at least two driven continuous loops of flexible material;
   a slat secured to the loops of the material moving system, the slat comprising:
     a web having opposed sides, the web secured to the loops of the material moving system;
     a first leg and a second leg extending outwardly from one side and positioned along the material moving system, the first leg providing a primary impetus for movement of crop material in a first direction by driven movement of the loops of the material moving system; and
     a third leg extending outwardly from an opposed side of the web and intermediate of portions of the web that are securable to the loops of the material moving system, the third leg providing a secondary impetus for movement of crop material in the first direction by driven movement of the loops of the material moving system; and
   wherein in response to the first leg encountering a foreign object that becomes wedged between the first leg, the third leg and structure of the material moving system and preventing driven movement of the loops of the material movement system in the first direction, in response to application of force urging movement of the loops of the material movement system in an opposed second direction, the third leg facilitating a rotational movement of the slat for dislodging the foreign object.

17. The agricultural harvester of claim 16, wherein the web is substantially planar.

18. The agricultural harvester of claim 17, wherein the first leg and third leg are substantially coplanar and mutually perpendicular to the web.

19. The agricultural harvester of claim 16, wherein the third leg is between the first leg and the second leg.

20. The agricultural harvester of claim 16, wherein the web is curved.

* * * * *